United States Patent [19]

Prucnal et al.

[11] 4,065,624

[45] Dec. 27, 1977

[54] RADIATION CURABLE COATING COMPOSITION

[75] Inventors: Paul J. Prucnal, Monroeville; Robert DeMajistre, Pittsburgh, both of Pa.

[73] Assignee: PPG Industries, Inc., Pittsburgh, Pa.

[21] Appl. No.: 652,687

[22] Filed: Jan. 27, 1976

[51] Int. Cl.$^2$ .......................... C08F 2/50; C08F 4/00; C08F 20/22; C08F 20/28
[52] U.S. Cl. .............................. 428/522; 204/159.23; 260/42.29; 260/42.49; 260/42.52; 526/292; 526/296
[58] Field of Search .............................. 526/292, 296; 204/159.23; 428/522

[56] References Cited

U.S. PATENT DOCUMENTS

| 3,679,447 | 7/1972 | Aronoff et al. ................. 526/296 X |
| 3,793,293 | 2/1974 | Ray-Chaudhuri et al. ..... 526/296 X |

FOREIGN PATENT DOCUMENTS

| 1,450,996 | 8/1966 | France. |
| 1,592,554 | 6/1970 | France. |
| 1,006,587 | 10/1965 | United Kingdom. |

*Primary Examiner*—Howard E. Schain
*Assistant Examiner*—W. C. Danison, Jr.
*Attorney, Agent, or Firm*—George D. Morris; J. Timothy Keane

[57] ABSTRACT

3-Halo-2-hydroxypropyl acrylates and methacrylates and 2-halo-1-(hydroxymethyl)ethyl acrylates and methacrylates are used as reactive solvent for an acrylic or methacrylic terminated polyether resin in radiation curable coating compositions.

16 Claims, No Drawings

RADIATION CURABLE COATING COMPOSITION

The present invention provides reactive solvents having lower toxicities than 2-hydroxyethyl acrylate and 2-hydroxypropyl acrylate, low volatilities and low viscosities and which are suitable for diluting acrylic functional polyether resins of the type heretofore described. Accordingly, the present invention contemplates a radiation curable coating composition having a binder comprising resin represented by the formula:

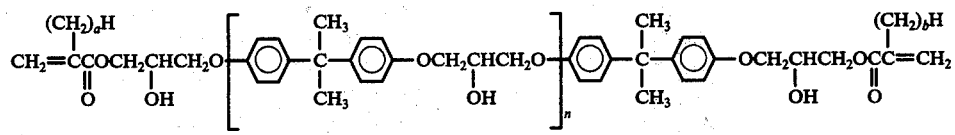

Resin represented by the formula:

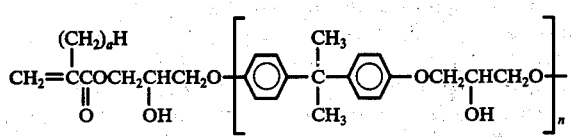

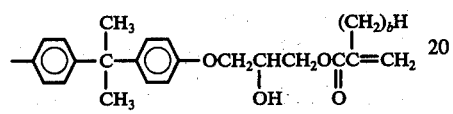

wherein the average value of $n$ is in the range of from 0 to 3 and wherein the average values of $a$ and $b$ are each independently in the range of from 0 to 1, is an excellent material for use as the principal crosslinkable film-forming component of radiation curable coating compositions. Desirable properties such as hardness, mar resistance, abrasion resistance, stain resistance, toughness and durability may be imparted to radiation cured films by this resin. It responds quickly to exposure to ionizing radiation or actinic light to produce cured coatings having these properties. When exposed to ultraviolet light, excellent surface cures may be obtained in air as well as in a substantially oxygen-free atmosphere because the degree of oxygen inhibition to curing is relatively low under these conditions.

Unfortunately, the viscosity of the resin is rather high and, in most cases, is too great for convenient application without dilution by one or more solvents. Inert volatile solvents such as methyl ethyl ketone, ethyl acetate, xylene, toluene, acetone, 2-methoxyethanol, ethanol and propanol provide satisfactory thinning, but their use is undesirable because additional equipment with its attendant expense is often necessary to remove the solvent from the film within a reasonable time and to confine pollution by solvent vapor within tolerable limits.

Reactive solvents have been used in an effort to eliminate or markedly reduce the need for removal of solvent from the film. However, many reactive solvents such as styrene, vinyl toluene, divinyl benzene, methyl acrylate, ethyl acrylate, propyl acrylate, butyl acrylate, methyl methacrylate, ethyl methacrylate, propyl methacrylate, butyl methacrylate and 2-ethylhexyl acrylate have such high volatilities that atmospheric pollution is still a major problem. Usually as the molecular weight of reactive solvent is increased in an effort to reduce volatility, the viscosities of the solvent and the coating composition of which it is a part are increased. The reactivity is also generally reduced by increasing the molecular weight. Upon exposure to ultraviolet light, the curing of many of these reactive solvents is inhibited by oxygen. Reactive solvents such as 2-hydroxyethyl acrylate and 2-hydroxypropyl acrylate which have acceptable volatilities and viscosities, unfortunately possess unacceptably high toxicities.

dissolved in reactive solvent represented by the formula:

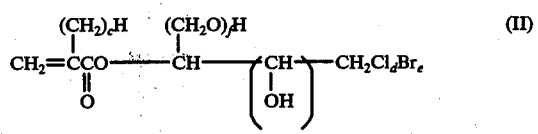

wherein
the average value of $n$ is in the range of from 0 to 3;
the average values of $a$, $b$ and $c$ are each independently in the range of from 0 to 1;
the average value of $d$ is in the range of from 0 to 1;
the average value of $e$ is in the range of from 0 to 1;
$d + e = 1$;
the average value of $f$ is in the range of from 0 to 1;
the average value of $g$ is in the range of from 0 to 1;
and
$f + g = 1$.

When the value of $a$ is zero, the $-(CH_2)_aH$ group is hydrogen. When the value of $a$ is one, the group is methyl. In an analogous manner, the similar groups containing $b$ and $c$ are either hydrogen or methyl, depending upon whether the values of $b$ and $c$ are zero or one. Although the values of $a$, $b$ and $c$ will each independently be either zero or one for any particular compound, the average values of these quantities for mixtures of compounds may be whole or fractional numbers in the range of from 0 to 1. The values of $a$, $b$ and $c$ may be determined analytically or, as is most often the case, by a knowledge of the structures of the starting materials used to prepare the compounds.

The values of $a$ and $b$ may be different for any particular compound, but it is preferred that they be the same. Often they are both one, but it is especially preferred that they both be zero in any particular compound. The resin may be a mixture of compounds wherein the average values of $a$ and $b$ are different, but it is preferred that the average values of $a$ and $b$ be the same. Usually, the average values of both $a$ and $b$ are zero or one. It is particularly preferred that the average values of both $a$ and $b$ be zero.

Similarly, the reactive solvent may be a mixture of compounds wherein the values of $c$ for the individual compounds constituting the mixture are different, but it is preferred that these values be the same, in which case the average value of $c$ for the mixture will be zero or one. It is particularly preferred that the average value of $c$ for the reactive solvent be zero.

The value of $n$ for any particular compound will be zero or a positive integer, while the average value of $n$ for a mixture of compounds constituting the resin may be a whole or fractional number. The value of $n$ for individual compounds may be 0, 1, 2, 3, 4 or even higher. Usually, the value of $n$ for individual compounds is 0, 1 or 2. When the average values of $a$ and $b$ are known, the average value of $n$ for the resin may be calculated from the number average molecular weight. The number average molecular weight may be found experimentally or calculated from the distribution of individual compounds, if this is known, using the equalities:

$$\overline{M}_n = \frac{\Sigma M_i N_i}{\Sigma N_i} = \frac{\Sigma w_i}{\Sigma m_i}$$

where
$\overline{M}_n$ is the number average molecular weight;
$M_i$ is the molecular weight of molecules of species i;
$N_i$ is the number of molecules of species i;
$w_i$ is the mass, expressed in grams, of molecules of species i; and
$m_i$ is the mass, expressed in gram-moles, of molecules of species i.

The average value of $n$ for the resin is in the range of from 0 to 3. Typically, it is in the range of from 0 to about 2. More often, the average value of $n$ is in the range of from 0 to about 1.

The values of $d$ and $e$ for any particular compound will be either 0 or 1. When the value of $d$ is one, the value of $e$ for the compound will be zero. Likewise, when the value of $d$ is zero, the value of $e$ for the compound will be unity. For mixtures of compounds, the average values of $d$ and $e$ may be whole or fractional numbers such that $d + e = 1$. Usually the average value of $d$ for the mixture is either zero or one and the average value of $e$ is, respectively, either one or zero. It is preferred that the average value of $d$ for the mixture be one and the average value of $e$ be zero.

The values of $f$ and $g$ for any particular compound will be either 0 or 1. When the value of $f$ is one, the value of $g$ for the compound will be zero. Likewise, when the value of $f$ is zero, the value of $g$ for the compound will be one. For mixtures of compounds, the average values of $f$ and $g$ may be whole or fractional numbers such that $f + g = 1$. When the reactive solvent is prepared by reacting epihalohydrin with acrylic acid and/or methacrylic acid, the values of $f$ and $g$ for a compound will be determined by which bond of the epoxide group is attacked during the reaction. The average values of $f$ and $g$ for the mixture of compounds resulting from the reaction will be determined by the distribution of the epoxide bonds attacked. Usually, the average value of $g$ for such mixtures is greater than the average value of $f$. For most purposes, it is not necessary to analyze mixtures of these compounds for the average values of $f$ and $g$, it being satisfactory to utilize the mixture as formed by the reaction. Nevertheless, it is permissible and sometimes desirable to modify the average values of $f$ and $g$ by adding appropriate amounts of specific compounds having structures within generic Formula II. Similarly, mixtures of compounds having appropriate values of $c, d, e, f$ and $g$ may be formed by admixing compounds having the structures within generic Formula II.

From a consideration of the permissible values of $c, d, e, f$ and $g$, a compound within generic Formula II are:
3-chloro-2-hydroxypropyl acrylate
3-chloro-2-hydroxypropyl methacrylate
3-bromo-2-hydroxypropyl acrylate
3-bromo-2-hydroxypropyl methacrylate
2-chloro-1-(hydroxymethyl)ethyl acrylate
2-chloro-1-(hydroxymethyl)ethyl methacrylate
2-bromo-1-(hydroxymethyl)ethyl acrylate
2-bromo-1-(hydroxymethyl)ethyl methacrylate The reactive solvent may comprise only one of these compounds or it may comprise mixtures of more than one. The preferred compounds are 3-chloro-2-hydroxypropyl acrylate and 3-bromo-2-hydroxypropyl acrylate. The former is especially preferred.

The proportions of resin and reactive solvent present in radiation curable coating compositions may vary widely. Usually, the amount of resin present is in the range of from about 5 percent to about 95 percent by weight of the binder. More often, it is in the range of from about 10 percent to about 80 percent by weight of the binder. An amount in the range of from about 15 to about 70 percent is preferred. The amount of reactive solvent present is usually in the range of from about 5 to about 95 percent by weight of the binder. An amount in the range of from about 20 percent to about 90 percent is typical. An amount in the range of from about 30 to about 85 percent by weight of the binder is preferred. Because the reactive solvent eventually becomes an integral part of the cured coating, it is considered to be a part of the binder.

The resin may be prepared by reacting bisphenol A-diglycidyl ether with acrylic acid, methacrylic acid or mixtures of these acids. The preparation is described in British Patent Specification No. 1,006,587. Several batches of resin may be blended together when desired.

Compounds consituting the reactive solvent may be prepared by reacting acrylic acid, methacrylic acid or mixtures of acrylic acid and methacrylic acid with epichlorohydrin, epibromohydrin or mixtures of epichlorohydrin and epibromohydrin. The reaction is usually conducted at an elevated temperature most often in the range of from about 50° C. to about 120° C. A stabilizer such as hydroquinone or 2,6-di-tert-butyl-4-methylphenol is usually present to inhibit free radical polymerization during the reaction. The reaction may be conducted with or without a solvent.

A solution comprising the resin dissolved in the reactive solvent may be prepared in several ways. One method is by simply admixing the resin and the reactive solvent. Another is by reacting bisphenol A-diglycidyl ether with acrylic and/or methacrylic acid in the presence of reactive solvent. Still another is by reacting epihalohydrin with acrylic and/or methacrylic acid in the presence of the resin. The preferred method is by reacting a mixture of bisphenol A-diglycidyl ether and epihalohydrin with acrylic and/or methacrylic acid.

The radiation curable coating composition may consist of substantially only the resin dissolved in the reactive solvent, but other materials are often also present.

When the coating composition is to be cured by exposure to ultraviolet light photoinitiator, photosensitizer or a mixture of photoinitiator and photosensitizer is usually present.

Photoinitiators are compounds which absorb photons and thereby obtain energy to form radical pairs, at least one of which is available to initiate addition polymerization of acrylic or methacrylic groups in the well-known manner. Photosensitizers are compounds which are good absorbers of photons, but which are themselves poor photoinitiators. They absorb photons to produce excited molecules which then interact with a second compound to produce free radicals suitable for initiation of addition polymerization. The second compound may be a monomer, a polymer or an added initiator. Examples of photoinitiators are benzoin, methyl benzoin ether, butyl benzoin ether, isobutyl benzoin ether, α,α-diethoxyacetophenone and α-chloroacetophenone. Examples of photosensitizers are benzil, 1-naphthaldehyde, anthraquinone, benzophenone, 3-methoxybenzophenone, benzaldehyde and anthrone.

The amount of photoinitiator, photosensitizer or mixture of photoinitiator and photosensitizer present in the radiation curable coating composition can vary widely. When any of these materials are present, the amount is usually in the range of from aboout 0.01 to about 10 percent by weight of the binder of the coating composition. Most often the amount is in the range of from about 0.1 to about 5 percent by weight of the binder. When the coating is to be cured by exposure to ionizing radiation, these materials are usually omitted from the coating composition, although their presence is permissible.

Extender pigments are often present in the radiation curable coating composition, particularly when the coating composition is used as a filler for wood or composition board such as particle board, hardboard of the Masonite type, flake board and chip board. The extender pigment gives the coating composition a paste-like consistency and, upon curing, provides an easily sandable surface. When ultraviolet light is used to cure the film, it is preferred that the extender pigment be substantially transparent to ultraviolet light. Examples of ultraviolet light transparent extender pigments are silica, calcium carbonate, barium sulfate, talc, aluminum silicates, sodium aluminum silicates and potassium aluminum silicates. When used, extender pigment is usually present in an amount in the range of from about 5 percent to about 85 percent by weight of the radiation curable coating composition. Ordinarily, the amount is in the range of from about 10 percent to about 75 percent by weight of the coating composition. An amount in the range of from about 30 percent to about 70 percent by weight is preferred. Mixtures of extender pigments as well as individual extender pigments may be employed.

Hiding and/or coloring pigment may optionally be present. When the pigment is of the ultraviolet light absorbing type and the coating composition is to be cured by exposure to ultraviolet light, the pigment should be used in amounts which do not preclude curing of the interior of the coating. The maximum amount is therefore related to the thickness of the coating to be cured. Thin coatings may tolerate more ultraviolet light absorbing pigment than thick coatings. Since ionizing radiation is much more penetrating than ultraviolet light, there is usually no significant problem with absorption of radiation by the pigment. When used, hiding and/or coloring pigment is usually present in an amount in the range of from about 0.1 percent to about 60 percent by weight of the coating composition. For thicker coatings, an amount in the range of from about 0.5 percent to about 50 percent is usually satisfactory. Examples of ultraviolet light absorbing hiding pigments are titanium dioxide, antimony oxide, zirconium oxide, zinc sulfide and lithopone. Examples of coloring pigments are iron oxides, cadmium sulfide, carbon black, phthalocyanine blue, phthalocyanine green, indanthrone blue, ultramarine blue, chromium oxide, burnt umber, benzidine yellow, toluidine red and aluminum powder. Individual pigments or mixtures of hiding and/or coloring pigments may be used.

Mixtures of extender pigments, hiding pigments and/or coloring pigments may also be employed.

Dyes in their customarily used amounts may be present in the coating composition.

Although not ordinarily desired, minor amounts, usually in the range of from about 0.1 to about 20 percent by weight of the vehicle, of volatile reactive solvent and/or inert volatile organic solvent may be present in the radiation curable coating composition.

Other relatively nonvolatile reactive solvents such as vinyl pyrrolidone may also be present. When used, they are generally present in an amount in the range of from about 0.1 percent to about 50 percent by weight of the binder. An amount in the range of from about 5 percent to about 25 percent by weight of the binder is typical.

Another optional ingredient is thermoplastic resin. When present, these are usually in an amount in the range of from about 0.1 percent to about 50 percent by weight of the binder of the radiation curable coating composition. Typically, the amount is in the range of from about 1 percent to about 25 percent by weight of the binder. Examples of thermoplastic resins which may be used are cellulose acetate, cellulose acetate butyrate, poly(vinyl chloride), copolymers of vinyl chloride and vinyl acetate, saturated polyesters, homopolymers and interpolymers of methyl methacrylate, methyl acrylate, ethyl acrylate, ethyl methacrylate, butyl acrylate, butyl methacrylate, 2-ethylhexyl acrylate, styrene and vinyl toluene. Individual thermoplastic resins or mixtures of such resins are useful. Brittle, friable thermoplastic resins are preferred in coating compositions used for filling wood. Examples are rosin, resins derived from rosin, chlorinated paraffins, chlorinated rubber, petroleum hydrocarbon resins and hard gums.

Various additional materials may be added to adjust the viscosity of the coating composition. Examples of such materials are fumed silica, castor oil based compositions (e.g., Thixatrol ST, Baker Castor Oil Company) modified clays, 12-hydroxystearic acid, tetrabutyl orthotitanate and microcrystalline cellulose. When used, these materials are usually present in an amount in the range of from about 0.5 percent to about 15 percent by weight of the binder.

The radiation curable coating compositions of the invention are usually prepared by simply admixing the solution of resin dissolved in reactive solvent with such other ingredients as may be present. Although mixing is usually accomplished at room temperature, elevated temperatures are sometimes used. The maximum temperature which is usable depends upon the heat stability of the ingredients. Temperatures above about 120° C. are only rarely employed.

The radiation curable coating compositions are used to form cured adherent coatings on substrates. The substrate is coated with the coating composition using substantially any technique known to the art. These include spraying, curtain coating, dipping, direct roll coating, reverse roll coating, painting, brushing, printing, drawing and extrusion. The coated substrate is then exposed to radiation of sufficient intensity for a time sufficient to crosslink the coating. The times of exposure to radiation and the intensity of the radiation to which the coating composition is exposed may vary greatly. Generally, the exposure to radiation should continue until the C-stage is reached when hard, solvent resistant films result. In certain applications, however, it may be desirable for the curing to continue only until the B-stage, viz., gel stage, has been obtained.

Substrates which may be coated with the compositions of this invention may vary widely in their properties. Organic substrates such as wood, fiberboard, particle board, composition board, paper, cardboard and various polymers such as polyesters, polyamides, cured phenolic resins, cured aminoplasts, acrylics, polyurethanes and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chromium, zinc and alloys.

Cured coatings of the radiation curable coating composition usually have thicknesses in the range of from about 0.001 millimeter to about 3 millimeters. More often they have thicknesses in the range of from about 0.007 millimeter to about 0.3 millimeter. When the radiation curable coating composition is a radiation curable printing ink, the cured coatings usually have thicknesses in the range of from about 0.001 millimeter to about 0.03 millimeter.

The coatings of this invention may be cured by exposure to ionizing radiation. Ionizing radiation is radiation possessing an energy at least sufficient to produce ions either directly or indirectly in a medium composed of common elements such as air or water and includes ionizing particle radiation and ionizing electromagnetic radiation. Ionizing particle radiation designates the emission of electrons or accelerated nuclear particles such as protons, alpha particles, deuterons, beta particles, neutrons or their analogs. Charged particles can be accelerated using such devices as resonance chamber accelerators, DC potential gradient accelerators, betatrons, synchrotrons, cyclotrons, etc. Neutron radiation can be produced by bombarding a selected light metal such as beryllium with positive particles of high energy. Ionizing particle radiation can also be obtained by the use of an atomic pile, radioactive isotopes or other natural or synthetic radioactive materials. Ionizing electromagnetic radiation comprises high energy photons. Examples are X-rays, bremsstrahlung and gamma rays.

X-rays may be produced when a metallic target such as tungsten, copper or molybdenum is bombarded with electrons of suitable energy. This energy is conferred to the electrons by accelerators, usually, but not necessarily, of the linear type. Travelling wave linear accelerators, standing wave linear accelerators and DC potential gradient linear accelerators are ordinarily employed for this purpose.

Bremsstrahlung, also known as continuous X-rays, is produced by the deceleration of electrons. The continuum extends from a short-wave limit dependent upon the maximum energy of the electrons indefinitely toward the long wavelength end of the spectrum.

Gamma rays may be obtained by means of a nuclear reactor, such as a pile, by the use of natural or synthetic radioactive materials such as cobalt 60 or radium which emit gamma rays, or by absorption of a neutron in the (n,γ) reaction.

The ionizing radiation, whether particle radiation or electromagnetic radiation, ordinarily has an energy of at least about 10 electron volts. While there is no upper limit to the energy of ionizing radiation which can be used advantageously, the effects desired in the practice of this invention can be accomplished without resorting to the use of ionizing radiation having energies above about 20,000,000 electron volts.

Accelerated electrons is the preferred ionizing radiation for crosslinking coatings of the radiation curable coating composition of the invention. Bremsstrahlung generated by the deceleration of the electrons is also present and probably contributes to crosslinking. Various types of linear electron accelerators are known, for example, the ARCO type travelling wave accelerator, model Mark I, operating at 3 to 10 million electron volts supplied by High Voltage Engineering Corporation, Burlington, Mass., or other types of accelerators such as are described in U.S. Pat. No. 2,763,609 and British Pat. Specification No. 762,953 are satisfactory for the practice of this invention. Usually the electrons are accelerated to energies in the range of from about 10,000 electron volts to about 1,000,000 electron volts. Typically, the energy is in the range of from about 20,000 electron volts to about 500,000 electron volts. Preferably, the energy is in the range of from about 25,000 electron volts to about 200,000 electron volts.

The unit of dose of ionizing radiation is the "rad" which is equal to 100 ergs of energy absorbed from ionizing radiation per gram of material being irradiated. Dose is initially determined using an absolute method such as calorimetry or ionization dosimetry. These absolute methods are quite sophisticated and hence are not generally practical for routine determinations. Once a radiation field has been explored by an absolute method of dosimetry, it is possible to calibrate secondary radiation indicators in that field using relative dosimetry techniques. One simple method of relative dosimetry is based upon the bleaching of blue cellophane by ionizing radiation. The blue cellophane is exposed to a standard source for a known time and the transmittance is measured with a spectrophotometer at 655 nanometers. The transmittance of unexposed cellophane is also measured and the percent change in transmittance due to exposure to ionizing radiation is calculated. From several such readings and calculations, a graph may be constructed relating change in transmittance with dose. A blue cellophane manufactured by the E. I. duPont deNemours & Company has been used for this purpose. The calibrated blue cellophane may then be used to calibrate other sources of the same kind of radiation and other kinds of blue cellophane which may be used in routine work. Avisco cellophane 195 CMS light blue manufactured by the American Viscose Division of FMC Corporation has been calibrated and used for routine dose determinations. In practice, the calibrated blue cellophane is exposed to the ionizing radiation before, after or simultaneously with the coated substrate being irradiated. The dose received by the coating is considered to be the same as that received by the blue cellophane. This presumes that the absorption of energy by the coating is the same as that of the blue cellophane. Except for materials containing rather large proportions of atoms of very high atomic weight, the absorption of ionizing radiation is nearly independently of the identity of the material. The presumption is therefore valid for the ordinary work of coatings manufacturing where very high degrees of accuracy of dose measurement are not needed. As used throughout the specification and claims, dose is referenced to the bleaching of calibrated blue cellophane film irrespective of the identity of the coating composition being irradiated.

Coatings of the radiation curable coating compositions of the invention are ordinarily exposed to ionizing radiation in an amount in the range of from about 0.01 megarad to about 20 megarads, although doses greater than 20 megarads may be used satisfactorily. The dose, however, should not be so great that the chemical or physical properties of the coating are seriously impaired. Typically, the dose is in the range of from about 0.1 megarad to about 20 megarads. The preferred dose is in the range of from about 1 megarad to about 10 megarads.

The coatings of the invention may also be cured by exposure to actinic light. Actinic light, as used herein, is electromagnetic radiation having a wavelength of 700 nanometers or less which is capable of producing, either directly or indirectly, free radicals capable of initiating addition polymerization of the coating compositions of the invention. Usually photoinitiator, photosensitizer or mixtures of photoinitiator and photosensitizer are present to absorb photons and produce the free radicals, although in some cases, these materials are not needed. Actinic light possesses insufficient energy to produce ions in a medium composed of common elements such as air or water and hence, has an energy below about 10 electron volts. The most commonly used form of actinic light is ultraviolet light, viz., electromagnetic radiation having a wavelength in the range of from about 180 nanometers to about 460 nanometers, although actinic light of greater or shorter wavelength may also be used effectively.

Any suitable source which emits ultraviolet light may be used in the practice of this invention. Suitable sources are mercury arcs, carbon arcs, low pressure mercury lamps, medium pressure mercury lamps, high pressure mercury lamps, swirl-flow plasma arc, ultraviolet light emitting diodes and ultraviolet light emitting lasers. Particularly preferred are ultraviolet light emitting lamps of the medium or high pressure mercury vapor type. Such lamps usually have fused quartz envelopes to withstand the heat and transmit the ultraviolet radiation and are ordinarily in the form of long tubes having an electrode at either end. Examples of these lamps are PPG Models 60-2032, 60-0393, 60-0197 and 60-2031 and Hanovia Models 6512A431, 6542A431, 6565A431 and 6577A431. Similarly, any suitable source producing actinic light having greater or shorter wavelengths than ultraviolet light may be used. Many types of such sources are well known.

The times of exposure to actinic light and the intensity of actinic light to which the coating composition is exposed may vary greatly. In keeping with the general principles heretofore set forth, the exposure to actinic light should usually continue until the C-stage is obtained. However, for certain applications, the exposure may be stopped when the B-stage has been achieved.

In the illustrative examples which follow, all parts are parts by weight and all percentages are percentages by weight unless otherwise specified.

EXAMPLE I

A reactor equipped with a thermometer, a heater, an agitator and a reflux condenser is charged with 137 parts epibromohydrin and 0.3 parts hydroquinone. The charge is heated to 100° C. and then 72 parts acrylic acid is added dropwise over a period of one hour. After the addition is completed, the reaction mixture is held at temperatures in the range of from 100° C. to 115° C. for seven hours and then cooled to room temperature. The product is placed in a distillation apparatus and distilled at an absolute pressure in the range of from about 200 to about 533 dynes per square centimeter while the vapor temperature at the head of the distillation column is in the range of from 43.5° C. to 59° C.

The product is a mixture of 3-bromo-2-hydroxypropyl acrylate and 2-bromo-1-(hydroxymethyl)ethyl acrylate.

EXAMPLE II

A reactor equipped with a thermometer, a heater, an agitator and a reflux condenser is charged with 360 parts acrylic acid, 1.485 parts 2,6-di-tert-butyl-4-methylphenol and 1.485 parts trimethyl benzyl ammonium chloride. The charge is heated to 90° C. and then 382.5 parts epichlorohydrin is added dropwise over a period of 85 minutes. The reaction mixture is then held at temperatures in the range of 95° C. to 98° C. for six hours and twenty minutes and then cooled to room temperature. Eighty-one hours later, heat is applied and the reaction mixture is held at about 100° C. for fourteen hours and forty-five minutes at the end of which time the acid number is 56. Heat is removed and the reaction mixture is cooled to room temperature. Nine hours later, the reaction mixture is heated to 100° C. and held at that temperature for fifteen hours and thirty minutes at the end of which period the acid number is 16. Heat is removed and the reaction mixture is cooled to room temperature. Eight hours and thirty minutes later, the reaction mixture is heated to 100° C. and held at that temperature for six hours at the end of which time, the acid number is 9. Heat is removed and the product is cooled to room temperature. The product is found to have an epoxy number of infinity, an acid number of 8.89 and a hydroxyl number of 213. The product is analyzed for chlorine. The result, expressed in percent by weight is shown in Table 1.

Table 1

| Chlorine Analysis of Product | |
|---|---|
| Calculated for $C_6H_9O_3Cl$ | 21.58 |
| Found | 21.2 |

The product is a mixture of 3-chloro-2-hydroxypropyl acrylate and 2-chloro-1-(hydroxymethyl)ethyl acrylate.

EXAMPLE III

A reactor equipped with a thermometer, a heater, an agitator and a condenser is charged with 700 parts epichlorohydrin and heated to 70° C. A mixture of 86 parts methacrylic acid, 1 part 2,6-di-tert-butyl-4-methylphenol and 1 part trimethyl benzyl ammonium chloride is slowly added over a period of 40 minutes. At the conclusion of this period, the temperature is 85° C. The reaction mixture is heated to total reflux and held at total reflux for four hours and ten minutes. The excess epichlorohydrin is then stripped off at an absolute pressure of about $3.533 \times 10^5$ dynes per square centimeter. The product is a mixture of 3-chloro-2-hydroxypropyl methacrylate and 2-chloro-1-(hydroxymethyl)ethyl methacrylate.

EXAMPLE IV

A reactor equipped with a thermometer, a heater, an agitator and a condenser is charged with 1840 parts acrylic acid, 26 parts tetraethyl ammonium chloride and 6 parts 2,6-di-tert-butyl-4-methylphenol and heated to 95° C. The dropwise addition of 2350 parts epichlorohydrin is begun. Sixty-five minutes later, (temperature: 130° C.), the addition is interrupted and the reaction mixture cooled. Thirty-five minutes later, (temperature: 98° C.), the dropwise addition of epichlorohydrin is resumed. Eleven hours and ten minutes later, (temperature: 96° C.), the addition of epichlorohydrin is completed. The reaction mixture is held at a temperature in the range of from about 95° C. to about 96° C. for 55 minutes and then cooled to room temperature. The product is found to have an epoxy number of $5.5 \times 10^4$, an acid number of 0.21, a hydroxyl number of 260 and a viscosity of 42 centipoises. The product is a mixture of 3-chloro-2-hydroxypropyl acrylate and 2-chloro-1-(hydroxymethyl)ethyl acrylate.

EXAMPLE V

A reactor equipped with a thermometer, a heater, an agitator and a reflux condenser is charged with 216 parts acrylic acid, 1.5 parts of 50 percent aqueous trimethyl benzyl ammonium hydroxide solution and 1 part 2,6-di-tert-butyl-4-methylphenol and heated to 100° C. Over a period of eight hours and ten minutes, 290 parts epichlorohydrin is added dropwise. Upon completion of the addition, the temperature is held at 98° C. for 110 minutes and then the reaction mixture is cooled to room temperature. Nine hours and five minutes later, heating is resumed. After 25 minutes, the temperature has risen to 70° C. After an additional period of 90 minutes, the temperature is 98° C. After another hour, the temperature is 100° C. Upon completion of a further period of one hour and forty-five minutes when the temperature is 115° C., power to the heater is shut off and the product is cooled to room temperature. The product is found to have an epoxy number of infinity, an acid number of 2.8, a hydroxyl number of 318 and to contain 0.037 percent water and 21.58 percent chlorine.

The product is a mixture of 3-chloro-2-hydroxypropyl acrylate and 2-chloro-1-(hydroxymethyl)ethyl acrylate.

EXAMPLE VI

A reactor equipped with a thermometer, a heater, an agitator and a condenser is charged with 1730 parts acrylic acid, 12 parts of 50 percent aqueous trimethyl benzyl ammonium hydroxide solution and 8 parts 2,6-di-tert-butyl-4-methylphenol and heated to 95° C. The dropwise addition of 2320 parts epichlorohydrin of about 96 percent purity is begun. Twelve hours later, (temperature: 100° C.), the addition has been completed. The reaction mixture is allowed to cool overnight. The next morning, the reaction mixture is heated to 90° C. and held at a temperature in the range of from about 90° C. to about 105° C. for 6½ hours and then cooled to room temperature. The product is found to have an epoxy number of infinity, an acid number of 4.17, a hydroxyl number of 275, a Gardner color of less than one and to contain 0.015 percent water and 20.75 percent chlorine.

The product is a mixture of 3-chloro-2-hydroxypropyl acrylate and 2-chloro-1-(hydroxymethyl)ethyl acrylate.

EXAMPLE VII

A reactor equipped with a thermometer, a heater, an agitator and a condenser is charged with 1840 parts acrylic acid, 26 parts tetraethyl ammonium chloride and 6 parts 2,6-di-tert-butyl-4-methylphenol and heated to 95° C. The dropwise addition of 2350 parts epichlorohydrin is begun. About eleven hours later, (temperature: 95° C.), approximately three-fourths of the epichlorohydrin has been added. The addition is interrupted and the reaction mixture is allowed to cool overnight. The next morning, the reaction mixture is heated to 95° C. and the dropwise addition of epichlorohydrin is resumed. After 3¼ hours, (temperature: 95° C.), the addition is completed. The reaction mixture is then held at a temperature in the range of from about 90° C. to about 105° C. for 3¼ hours. The mixture is then filtered through diatomaceous earth filter aid. The filtrate is then allowed to cool to room temperature. This product is found to have an epoxy number of infinity, an acid number of 7, a hydroxyl number of 286, a Gardner color of 1-, a viscosity of 62.5 centipoises and to contain 19.68 percent hydrolyzable chlorine. The product is a mixture of 3-chloro-2-hydroxypropyl acrylate and 2-chloro-1-(hydroxymethyl)ethyl acrylate.

EXAMPLE VIII

A reactor equipped with a thermometer, a heater, an agitator and a condenser is charged with 1584 parts acrylic acid, 11 parts triphenylphosphine and 7.48 parts 2,6-di-tert-butyl-4-methylphenol and heated to 102° C. Over a period of four hours and eight minutes, 2145 parts epichlorohydrin is added while maintaining the temperature in the range of from about 100° C. to about 107.5° C. At the end of this period, the temperature of the reaction mixture is 104.5° C. The reaction mixture is then heated. After fifteen minutes, the temperature has risen to 114° C. Ten minutes later, the temperature is 116° C. and power to the heater is shut off. Thirteen minutes later, the temperature is 112° C. and a portion of the power is restored to the heater. Fifty-seven minutes later, the temperature is 106° C. The temperature is then maintained in the range of from about 106° C. to about 107° C. for fifty-five minutes. Power to the heater is shut off and the reaction mixture is cooled. The reaction mixture is then filtered through diatomaceous earth filter aid. The product, which is the filtrate, is found to have an epoxy number of infinity, an acid number of 0.73, a hydroxyl number of 275, a Gardner color of 1 and to contain 20.2 percent chlorine. The product is a mixture of 3-chloro-2-hydroxypropyl acrylate and 2-chloro-1-(hydroxymethyl)ethyl acrylate containing 3.06 percent free epichlorohydrin.

EXAMPLE IX

A reactive solvent is prepared by admixing 100 parts 3-chloro-2-hydroxypropyl acrylate, 50 parts 3-chloro-2-hydroxypropyl methacrylate, 25 parts 3-bromo-2-hydroxypropyl acrylate, 15 parts 2-chloro-1-(hydroxymethyl)ethyl acrylate and 10 parts 2-bromo-1-(hydroxymethyl)ethyl methacrylate. The reactive solvent is represented by the formula:

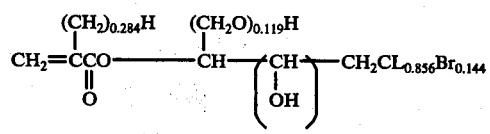

EXAMPLE X

A reactor equipped with a thermometer, a heater, a cooler, an agitator, a condenser set for total reflux, a source of air and a source of nitrogen is charged with 1156 parts acrylic acid, 0.44 part methyl hydroquinone, 6.1 parts, 2,6-di-tert-butyl-4-methylphenol, 21.1 parts 2-[2-[4-(1,1,3,3-tetramethylbutyl)-3-methylphenoxy]ethoxy]ethyl dimethyl benzyl ammonium chloride monohydrate and 205 parts toluene and a slight air sparge is applied. The charge is then heated to 107° C. Over a period of 3½ hours, 2915 parts bisphenol A-diglycidyl ether (Epon 828; Shell Chemical Co.) which has been preheated to a temperature in the range of from 51.6° C. to 54.6° C. is added to the reactor while maintaining the temperature of the reaction mixture in the range of from 107° C. to 109° C. Upon completion of the addition, the temperature of the reaction mixture is held in the range of from 107° C. to 110° C. for 3¾ hours. At the end of this period, the condenser is set for total distillation, viz., no condensate is returned to the reactor, and both air and nitrogen sparges are applied. The reaction mixture is held at a temperature in the range of from 108° C. to 113° C. for 5 hours and distillate is removed. At the conclusion of this period, heat is shut off, cooling is applied and a slight air sparge is maintained. One hour later when the temperature has reached 90.6° C., the product is discharged from the reactor through a nylon bag filter into containers. The product, which is the diacrylate of bisphenol A-diglycidyl ether, is found to have an acid number of 0.5, a hydroxyl number of 214 and to contain 0.01 percent water and 0.2 percent toluene. A 75 percent solution of the product in ethyl cellosolve has a Gardner-Holdt viscosity of T-U. The product may be depicted as having the structural formula:

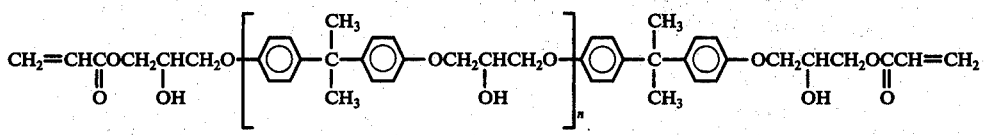

where the value of n is in the range of from 0 to about 1.

EXAMPLE XI

A reactor equipped with a thermometer, a heater, a cooler, an agitator, a condenser set for total reflux, a source of air and a source of nitrogen is charged with 1672 parts acrylic acid, 9.3 parts 2,6-di-tert-butyl-4-methylphenol and 9.3 parts triphenylphosphine, an air sparge and a nitrogen sparge are applied. The charge is then heated to 104° C. Over a period of 3½ hours, 2395 parts of a mixture comprising 1675 parts epichlorohydrin and 720 parts bisphenol A-diglycidyl ether (Epon 828; Shell Chemical Co.) is added to the reactor while maintaining the temperature of the reaction mixture in the range of from 104° C. to 106° C. Upon completion of the addition, the temperature of the reaction mixture is held in the range of from 106° C. to 118° C. for 6¼ hours. At the end of this period (temperature: 117.2° C.), 20.5 parts bis(β-hydroxyethyl)sulfide is added to the reaction mixture, heat is shut off and cooling is applied. Seventy-five minutes later when the temperature has reached 49° C., the product is discharged through a filter into containers. The product, which is a mixture of 3-chloro-2-hydroxypropyl acrylate, 2-chloro-1-(hydroxymethyl)ethyl acrylate, the diacrylate of Epon 828 bisphenol A-diglycidyl ether and bis(β-hydroxyethyl)sulfide is found to have an acid number of 5.0, a viscosity of 298 centipoises, a hydroxyl number of 250 and to contain 0.01 percent water and 15.6 percent chlorine.

EXAMPLE XII

A reactor equipped with a thermometer, a heater, a cooler, an agitator, a condenser set for total reflux, a source of air and a source of nitrogen is charged with 380.8 parts acrylic acid, 1.87 parts 2,6-di-tert-butyl-4-methylphenol and 1.86 parts triphenylphosphine and an air sparge is applied. The charge is then heated to 110° C. A mixture comprising 385 parts epichlorohydrin and 166.6 parts Epon 828 bisphenol A-diglycidyl ether is preheated to about 110° C. Over a period of 4 hours, 551.6 parts of the preheated mixture is added to the reactor while maintaining the temperature of the reaction mixture in the range of from 110° C. to 111.7° C. Upon completion of the addition, the temperature of the reaction mixture is held in the range of from 110° C. to 113° C. for 75 minutes. At the end of this period (temperature: 112.2° C.), heat is shut off and cooling is applied. Fifteen minutes later (temperature: 96.1° C.), the condenser is set for distillation, a slight vacuum of 1.2 × 10⁵ dynes per square centimeter is applied while maintaining an air sparge and distillation is begun. Two hours later (temperature: 97.8° C.), 21 parts distillate has been removed and the vacuum is removed. Thirty minutes later (temperature: 97.2° C.), a slight vacuum of 1.07 × 10⁵ dynes per square centimeter is applied while maintaining an air sparge and distillation is again begun. Two hours later (temperature: 97.2° C.), 7 additional parts distillate has been removed and the vacuum and air sparge are removed. Fifteen minutes later (temperature: 97.8° C.), the vacuum and air sparge are reapplied. Thirty minutes later (temperature: 97.8° C.), the vacuum and air sparge are removed, heat is shut off and cooling is applied. Forty-five minutes later when the temperature has reached 54.4° C., the product is discharged through a filter into containers. The product, which is a mixture of 3-chloro-2-hydroxypropyl acrylate, 2-chloro-1-(hydroxymethyl)ethyl acrylate and the diacrylate of Epon 828 bisphenol A-diglycidyl ether, is found to have an acid number of 3.9, a Gardner-Holdt viscosity of K, a hydroxyl number of 242 and to contain 0.02 percent water and 14.1 percent chlorine.

EXAMPLE XIII

A filler composition is prepared by admixing 75 parts of the diacrylate or Epon 828 bisphenol A-diglycidyl ether, 108 parts of the product of Example VI, 100 parts Montana platy talc having a mean particle size of less than 2 micrometers (Mistron Vapor; United Sierra Division of Cypress Mines Corp.) and 3.7 parts isobutyl benzoin ether. The viscosity of the filler composition is determined to be 296,000 centipoises by a Brookfield viscometer using a number 7 spindle at 10 revolutions per minute.

The filler composition is drawn down on aluminum substrates using a number 018 wire wound drawbar. The coated substrates are passed once, in air, through an ultraviolet light processor containing four medium pressure mercury vapor lamps which are emitting ultraviolet light. The lamps are 8.89 centimeters above the plane of the substrate surface. Following exposure to the ultraviolet light, the coated substrates are evaluated for degree of cure by rubbing the coating with an acetone soaked cloth under approximately similar conditions of pressure and frequency and noting the number of rubs (wherein one rub is a combined back and forth motion) necessary to expose the substrate. A maximum of one hundred rubs is used. The speed with which the coated substrates are passed under the ultraviolet light emitting lamps and the results of the acetone rub test are shown in Table 2.

Table 2

| Speed of Travel Through Ultraviolet Light Processor | | Number of Acetone Rubs to Expose Substrate |
|---|---|---|
| feet/minute | meters/minute | |
| 40 | 12.2 | >100 |
| 50 | 15.2 | >100 |
| 60 | 18.3 | >100 |
| 70 | 21.3 | >100 |
| 80 | 24.4 | >100 |
| 90 | 27.4 | >100 |
| 100 | 30.5 | >100 |
| 150 | 45.7 | >100 |
| 180 | 54.9 | >100 |
| 190 | 57.9 | >100 |
| 200 | 61.0 | 80 |

Using the same drawbar, the filler composition is drawn down on an unsanded particle board substrate. The coated substrate is passed once, in air, through the ultraviolet light processor at 150 feet/minute (45.7 meters/minute) to produce a filled particle board. The substrate is not exposed after 100 acetone rubs. Adhesion of the cured coating to the particle board is tested by the crosshatch test. In this test, a first series of parallel lines and a second series of parallel lines which are perpendicular to the lines of the first series are scribed through the coating to the substrate so as to form a checkerboard pattern of squares, each square being about 3.175 millimeters on a side. Three times No. 600 Scotch brand adhesive tape (3M Corp.) is applied to the scribed area and pulled off suddenly. The percent of the taped crosshatched area from which coating has been removed is then determined. A loss in the range of 0 percent to 5 percent is given a rating of good. A loss in the range of from above 5 percent to 30 percent is given a rating of fair. A loss above 30 percent is given a rating of poor. When subjected to the crosshatch test, the cured coating on the particle board substrate has a crosshatch rating of good.

Sanding characteristics of the cured coating on the particle board are tested by the sanding test. In this test, the coating is sanded with number 350 grit sandpaper using 10 back and forth rubs. The sandpaper is then flicked or brushed against a cloth. The percent of the powder retained in the sandpaper is then determined. A low degree of retention in the sandpaper is desirable. When subjected to the sanding test, the cured coating on the particle board had a sanding rating of <5 percent retention.

A groundcoat composition comprising an acrylic solvent base lacquer pigmented with titanium dioxide is drawn down on the unsanded filled particle board using a number 036 wire wound drawbar. The coated article is placed in an oven at 121° C. for three minutes to produce a groundcoated panel. When subjected to the crosshatch test, the groundcoated panel has a rating of good. A portion of the groundcoated panel is lightly sanded. A topcoat composition comprising a diethylene propylene maleate, styrene, the diacrylate of Epon 828 bisphenol A-diglycidyl ether, photoinitiator and flatting silica is drawn down over both the sanded and unsanded areas using a number 018 wire wound drawbar. The coated panel is passed once, in air, through the four lamp ultraviolet light processor described above at a speed of 20 feet/minute (6.1 meters/minute) to produce a topcoated panel. When subjected to the crosshatch test, the topcoated sanded area has a rating of good and the topcoated unsanded area has a rating of fair.

EXAMPLE XIV

A filler composition is prepared by admixing 39 parts of the diacrylate of Epon 828 bisphenol A-diglycidyl ether, 91 parts of the product of Example VII, 70 parts Mistron Vapor Montana platy talc and 2.2 parts isobutyl benzoin ether. The viscosity of the filler composition is determined to be 198,000 centipoises by a Brookfield viscometer using a number 7 spindle at 20 revolutions per minute.

The filler composition is drawn down on aluminum substrates using a number 018 wire wound drawbar. The coated substrates are passed once, in air, through the four lamp ultraviolet light processor of Example XIII. Following exposure to ultraviolet light, the coated substrates are evaluated for degree of cure by the acetone rub test described in Example XIII. The speed with which the coated substrates are passed under the ultraviolet light emitting lamps and the results of the acetone rub test are shown in Table 3.

Table 3

| Speed of Travel Through Ultraviolet Light Processor | | Number of Acetone Rubs to Expose Substrate |
|---|---|---|
| feet/minute | meters/minute | |
| 140 | 42.7 | 90 |
| 130 | 39.6 | >100 |
| 120 | 36.6 | >100 |
| 100 | 30.5 | >100 |

EXAMPLE XV

A filler composition is prepared and drawn down on aluminum substrates as described in Example XIV. The viscosity of the filler composition is determined to be 448,000 centipoises by a Brookfield viscometer using a number 7 spindle at 5 revolutions per minute. The coated substrates are passed once, in air, through the four lamp ultraviolet light processor of Example XIII. Following exposure to ultraviolet light, the coated substrates are evaluated for degree of cure by the acetone rub test described in Example XIII and two of the coated substrates are evaluated for sandability by the sanding test described in Example XIII. The speed with which the coated substrates are passed under the ultraviolet light emitting lamps and the results of the testing are shown in Table 4.

Table 4

| Speed of Travel Through Ultraviolet Light Processor | | Number of Acetone Rubs to Expose Substrate | Percent Powder Retained on Sandpaper |
|---|---|---|---|
| feet/minute | meters/minute | | |
| 140 | 42.7 | 85 | 50 |
| 120 | 36.6 | 80 | Not tested |
| 100 | 30.5 | >100 | 10 |

EXAMPLE XVI

A filler composition is prepared by admixing 36 parts of the diacrylate of Epon 828 bisphenol A-diglycidyl ether, 84 parts of the product of Example VIII, 45 parts aluminum silicate having a mean particle size of 4.5 micrometers and a nodular particle shape (Minex #7, Indusmin Ltd., Ontario, Canada), 45 parts Mistron Vapor Montana platy talc and 2.1 parts isobutyl benzoin ether. The viscosity of the filler composition is determined to be 40,000 centipoises by a Brookfield viscometer using a number 7 spindle at 20 revolutions per minute and 20,000 centipoises using a number 7 spindle at 100 revolutions per minute.

The filler composition is drawn down on particle board substrates using a number 018 wire wound drawbar. The coated substrates are passed once, in air, through the four lamp ultraviolet light processor of Example XIII to produce filled particle board. Following exposure to ultraviolet light, the filled particle board is evaluated for adhesion by the crosshatch test described in Example XIII, for sanding characteristics by the sanding test described in Example XIII and for hardness by the pencil hardness test. The pencil hardness test involves a set of pencils ranging from 6B soft to 6H hard. Starting with the hard end of the set, they are pushed in turn into the film. The first pencil which crumbles instead of penetrating indicates the pencil hardness. The speed with which the coated substrates are passed under the ultraviolet light emitting lamps and the results of the tests are shown in Table 5.

Table 5

| Speed of Travel Through Ultraviolet Light Processor | | Percent Powder Retained on Sandpaper | Crosshatch Adhesion, percent removed | Pencil Hardness |
|---|---|---|---|---|
| feet/minute | meters/minute | | | |
| 100 | 30.5 | 0 | 0 | 2B |
| 150 | 45.7 | 0 to 5 | 0 | 2B |

Using a number 018 wire wound drawbar, the groundcoat composition described in Example XIII is drawn down on sanded and unsanded portions of the filled particle board and placed in an oven at 121° C. for 2½ minutes to produce a groundcoated panel. The groundcoated panel is then subjected to the crosshatch test in both the areas where the filler was sanded and left unsanded. The data are shown in Table 6.

Table 6

| Speed of Travel Through Ultraviolet Light Processor | | Crosshatch Adhesion, percent removed | |
|---|---|---|---|
| feet/minute | meters/minute | Filler Sanded | Filler Unsanded |
| 100 | 30.5 | 0 | 0 |
| 150 | 45.7 | 5 | 0 |

EXAMPLE XVII

An intermediate composition is prepared by admixing 1090 parts of the diacrylate of Epon 828 bisphenol A-diglycidyl ether, 2540 parts of the product of Example VIII, 1360 parts Minex #7 aluminum silicate, 1360 parts Mistron Vapor Montana platy talc. The viscosity of the intermediate composition is determined to be 80,000 centipoises by a Brookfield viscometer using a number 7 spindle at 20 revolutions per minute and 56,000 using a number 7 spindle at 50 revolutions per minute.

A filler composition is prepared by admixing one part isobutyl benzoin ether and 100 parts of the above intermediate composition.

The filler composition is drawn down on particle board substrates using a number 018 wire wound drawbar. The coated substrates are passed once, in air, through the four lamp ultraviolet light processor of Example XIII to produce filled particle boards. The filled particle boards are tested for sanding characteristics by the sanding test described in Example XIII. The speed with which the coated substrates are passed under the ultraviolet light emitting lamps and the results of the test are shown in Table 7.

Table 7

| Speed of Travel Through Ultraviolet Light Processor | | Percent Powder Retained on Sandpaper |
|---|---|---|
| feet/minute | meters/minute | |
| 100 | 30.5 | 0 |
| 150 | 45.7 | 0 to 5 |

EXAMPLE XVIII

A first filler composition is prepared by admixing 90 parts of the intermediate composition of Example XVII, 2.25 parts of the product of Example VIII and 0.92 part isobutyl benzoin ether. The viscosity is determined to be 42,000 centipoises by a Brookfield viscometer using a number 7 spindle at 20 revolutions per minute and 21,200 centipoises using a number 7 spindle at 100 revolutions per minute.

A second filler composition is prepared by admixing 90 parts of the intermediate composition of Example XVII, 4.5 parts of the product of Example VIII and 0.95 part isobutyl benzoin ether. The viscosity is determined to be 22,000 centipoises by a Brookfield viscometer using a number 7 spindle at 20 revolutions per minute and 12,000 centipoises using a number 7 spindle at 100 revolutions per minute.

The first and second filler compositions are drawn down on separate particle board substrates using a number 018 wire wound drawbar. The coated substrates are passed once, in air, through the four lamp ultraviolet light processor of Example XIII at a speed of 30.5 meters per minute to produce first and second filled particle boards, respectively. The filled particle boards are subjected to the crosshatch test, the pencil hardness test and the sanding test which are described in Example XIII. The test results are shown in Table 8.

Table 8

| Filled Particle Board | Percent Powder Retained on Sandpaper | Crosshatch Adhesion percent removed | Pencil Hardness |
|---|---|---|---|
| First | 0 to 5 | 0 | B |
| Second | 5 | 0 | B |

EXAMPLE XIX

An intermediate composition is prepared by admixing 900 parts of the product of Example XII and 100 parts bis($\beta$-hydroxyethyl)sulfide.

A first filler composition is prepared by admixing 200 parts of the above intermediate, 0.7 part antisettling agent (Anti Terra U; Byk-Mallinkrodt), 19.7 parts Mistron Vapor Montana platy talc, 98 parts aluminum silicate clay, 98 parts amorphous silica (Imsil A-25; Illinois Minerals), 49 parts ground marble and 4.1 parts isobutyl benzoin ether. The viscosity of the first filler composition is determined to be 22,000 centipoises by a Brookfield viscometer using a number 7 spindle at 100 revolutions per minute.

The first filler composition is drawn down on glass substrates using a number 0.0015 Bird applicator. The coated substrates are passed once, in air, through the four lamp ultraviolet light processor of Example XIII. The cured coated substrates are then subjected to the crosshatch and sanding tests described in Example XIII. The speeds of passage under the ultraviolet light emitting lamps and the results of the testing are shown in Table 9.

Table 9

| Speed of Travel Through Ultraviolet Light Processor | | Crosshatch Adhesion, percent removed | Percent Powder Retained on Sandpaper |
|---|---|---|---|
| feet/minute | meters/minute | | |
| 60 | 18.3 | 1 | 0 |
| 80 | 24.4 | 2 | 0 |

A second filler composition is prepared by admixing 200 parts by the product of Example XII, 0.7 part Anti Terra U antisettling agent, 19.7 parts Mistron Vapor Montana platy talc, 98 parts aluminum silicate clay, 98 parts Imsil A-25 amorphous silica, 49 parts ground marble and 4.1 parts isobutyl benzoin ether. The viscosity of the second filler composition is determined to be 30,000 centipoises by a Brookfield viscometer using a number 7 spindle at 100 revolutions per minute.

The second filler composition is drawn down on glass substrates using a number 0.0015 Bird applicator. The coated substrates are passed once, in air, through the four lamp ultraviolet light processor of Example XIII. The cured coated substrates are then subjected to the crosshatch and sanding tests described in Example XIII. The speeds of passage under the ultraviolet light emitting lamps and the results of the testing are shown in Table 10.

Table 10

| Speed of Travel Through Ultraviolet Light Processor | | Crosshatch Adhesion percent removed | Percent Powder Retained on Sandpaper |
|---|---|---|---|
| feet/minute | meters/minute | | |
| 60 | 18.3 | 0 | 0 |
| 80 | 24.4 | 1 | 0 |

EXAMPLE XX

An intermediate composition is prepared by admixing 775 parts of the product of Example XII, 159 parts of the triacrylate of pentaerithritol, 46 parts epoxidized linseed oil (Paraplex G-62; Rohm & Haas Co.) and 20 parts resinous silicone flow additive (Byk-300; Byk-Mallinkrodt Co.).

A first base white composition is prepared by grinding 500 parts titanium dioxide pigment in 350 parts of the above intermediate composition to a Hegman 7 grind and then thinning with 150 parts of the above intermediate composition.

A first white coating composition is prepared by admixing 80 parts of the above first base white composition, 8 parts methyl ethyl ketone, 0.8 part methylanthraquinone and 0.8 part isobutyl benzoin ether. The viscosity of the first white coating composition is determined to be 1280 centipoises by a Brookfield viscometer using a number 5 spindle at 50 revolutions per minute and 840 centipoises using a number 5 spindle at 100 revolutions per minute.

The first white coating composition is drawn down on aluminum substrates using a number 006 wire wound drawbar. Separate coated substrates are passed through the four lamps ultraviolet light processor of Example XIII at speeds of 15.2, 30.5, 45.7 and 61.0 meters per minute, respectively. Another coated substrate is passed at a speed of 61.0 meters per minute through the ultraviolet light processor which has only three lamps in operation. The coatings of all coated substrates passed through the ultraviolet light processor having four lamps operating were dry and resistant to finger rubbing, but were able to be removed by tape without previous crosshatching. Tape-off with previous crosshatching is eliminated for these coated substrates by post baking for 2 minutes at 204.4° C. in a circulating air oven.

A second white coating composition is prepared by admixing 50 parts of the above first base white composition, 5.8 parts methyl ethyl ketone, 0.7 part methylanthraquinone, 0.7 part isobutyl benzoin ether and 8 parts of the above intermediate composition. The viscosity of the second white coating composition is determined to be 640 centipoises by a Brookfield viscometer using a number 5 spindle at 100 revolutions per minute.

The second white coating composition is drawn down on aluminum substrates using a number 006 wire wound drawbar. Separate coated substrates are passed through the ultraviolet light processor in the same manner as that described above for the first white coating composition to obtain substantially the same results. Better hiding is provided by the first white coating composition than the second white coating composition.

A second base white composition is prepared by grinding 415 parts titanium dioxide pigment in 400 parts of the above intermediate composition to a Hegman 7 grind and then thinning with 155 parts of the above intermediate composition.

A third white coating composition is prepared by admixing 50 parts of the above second base white composition, 5 parts methyl ethyl ketone, 0.6 part methylanthraquinone and 0.6 part isobutyl benzoin ether. The viscosity of the third white coating composition is determined to be 200 centipoises by a Brookfield viscometer using a number 5 spindle at 100 revolutions and 220 centipoises using a number 4 spindle at 100 revolutions per minute.

The third white coating composition is drawn down on aluminum substrates using a number 006 wire wound drawbar. Separate coated substrates are passed through the ultraviolet light processor in the same manner as that described above for the first white coating composition to obtain substantially the same degree of hiding as obtained by the first white coating composition. The cured coating is tested for adhesion.

A fourth white coating composition is prepared by admixing 70 parts of the above second base white composition, 7 parts methyl ethyl ketone, 1.6 parts methyl phenylglyoxylate, 0.8 part isobutyl benzoin ether and 0.21 part methylanthraquinone. The viscosity of the fourth white coating composition is determined to be 180 centipoises by a Brookfield viscometer using a number 4 spindle at 100 revolutions per minute.

The fourth white coating composition is drawn down on an aluminum substrate and passed once, in air, through the fourth lamp ultraviolet light processor of Example XIII at a speed of 61.0 meters per minute to produce a hard, infusible coating showing good hiding. The cured coating is tested for adhesion.

Of the four white coating compositions, the fourth white coating composition provides the best adhesion and the third white coating composition provides the next best adhesion.

EXAMPLE XXI

A solution is prepared by dissolving 573 parts adhesion promoting resin (22D-54; Rohm & Haas Co.) in 397 parts hot methyl ethyl ketone.

A first intermediate composition is prepared by admixing 970 parts of the above solution, 1795 parts of the product of Example XII, 1108 parts of the triacrylate of pentaerithritol and 27 parts Paraplex G-62 epoxidized linseed oil.

A second intermediate is prepared by grinding 1530 parts of the above first intermediate, 2370 parts titanium dioxide, 29 parts methylanthraquinone, 38 parts spermaceti wax and 95 parts Byk-300 resinous silicone flow additive with a Cowles blade to a Hegman 7 grind.

A coating composition is prepared by admixing 4062 parts of the above second intermediate, 1100 parts of the above first intermediate, 283 parts 3-acrylyloxy-2,2-dimethylpropyl 3-acrylyloxy-2,2-dimethylpropionate, 189 parts of a urea-formaldehyde resin composition (U formite F-240; Rohm & Haas Co.) having 60 percent solids (solvents are xylol-butanol 1:1.5), 283 parts 1-acrylyloxy-2-hydroxy-3-butoxypropane (prepared by reacting one molar part acrylic acid with one molar part 1,2-epoxy-3-butoxypropane), 95 parts methyl phenylglyoxylate, 62 parts isobutyl benzoin ether and 283 parts methyl ethyl ketone.

The coating composition is drawn down on an aluminum substrate using a number 009 wire wound drawbar. The coated substrate is passed once, in air, at a speed of 61.0 meters per minute through the four lamp ultraviolet light processor of Example XIII to produce a hard, infusible coating. When subjected to the crosshatch test of Example XIII, much of the coating is removed by the tape. After post baking for 2 minutes at 204.4° C. in a circulating air oven, a crosshatch rating of good is achieved. Submersion in buffered borax solution at 71.1° C. for 30 minutes similarly yields a crosshatch rating of good.

EXAMPLE XXII

A coating composition is prepared by admixing 23.72 parts of the product of Example XI, 5.49 parts of the product of Example X, 0.21 part 1-acrylyloxy-2-hydroxy-3-butoxypropane, 0.77 part Byk-300 resinous silicone flow additive, 0.88 part diethoxyacetophenone and 0.88 part ethyl phenylglyoxylate.

The coating composition is applied to various substrates at a rate of 0.387 milligram per square centimeter using a hand-operated direct roll coater. The substrates used are of aluminum, of tin-free steel and of tin-free steel coated with a white coating composition which has been cured. The coated substrates are passed once, in air, at a speed of 57.9 meters per minute through the four lamp ultraviolet light processor of Example XIII having only three lamps operating to produce cured coatings having, on the average, substantially no tack when pressed with a thumb, substantially no mar when scratched with a fingernail and a rating of fair when tested by the crosshatch test of Example XIII. After post baking for 3 minutes at 204.4° C. in a circulating air oven, an average crosshatch rating of good is obtained.

We claim:

1. A radiation curable coating composition having a binder comprising resin represented by the formula:

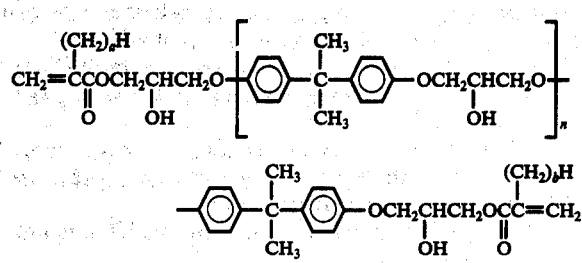

dissolved in a reactive solvent represented by the formula:

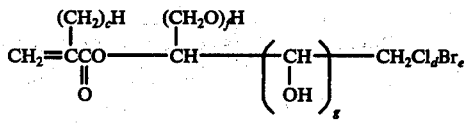

wherein
a. the average value of $n$ is in the range of from 0 to 3;
b. the average values of $a$, $b$ and $c$ are each independently in the range of from 0 to 1;
c. the average value of $d$ is in the range of from 0 to 1;
d. the average value of $e$ is in the range of from 0 to 1;
e. $d + e = 1$;
f. the average value of $f$ is in the range of from 0 to 1;
g. the average value of $g$ is in the range of from 0 to 1; and
h. $f + g = 1$.

2. The radiation curable coating composition of claim 1 wherein said resin is present in an amount in the range of from about 5 percent to about 95 percent by weight of said binder and wherein said reactive solvent is present in an amount in the range of from about 5 percent to about 95 percent by weight of said binder.

3. The radiation curable coating composition of claim 1 including photoinitiator, photosensitizer or a mixture of photoinitiator and photosensitizer in an amount in the range of from about 0.01 percent to about 10 percent by weight of said binder.

4. The radiation curable coating composition of claim 1 including thermoplastic resin in an amount in the range of from about 0.1 percent to 50 percent by weight of said binder.

5. The radiation curable coating composition of claim 1 including extender pigment in an amount in the range of from about 5 percent to about 85 percent by weight of said radiation curable coating composition.

6. The radiation curable coating composition of claim 5 wherein said extender pigment is substantially transparent to ultraviolet light.

7. The radiation curable coating composition of claim 1 including hiding pigment, coloring pigment or mixtures thereof in an amount in the range of from about 0.1 percent to about 60 percent by weight of said radiation curable coating composition.

8. The radiation curable coating composition of claim 1 including ultraviolet light absorbing hiding pigment in the range of from about 0.1 to about 60 percent by weight of said radiation curable coating composition.

9. The radiation curable coating composition of claim 8 wherein said ultraviolet light absorbing hiding pigment is titanium dioxide, antimony oxide, zirconium oxide, zinc sulfide, lithopone or mixtures thereof.

10. The radiation curable coating composition of claim 1 wherein the average value of $n$ is in the range of from 0 to 1.

11. The radiation curable coating composition of claim 1 wherein the average values of $a$, $b$, $c$ and $e$ are zero and the average value of $d$ is one.

12. A radiation curable coating composition comprising
   a. a binder comprising resin represented by the formula:

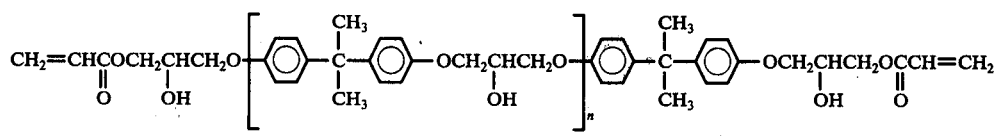

dissolved in a reactive solvent which is 3-chloro-2-hydroxypropyl acrylate, 2-chloro-1-(hydroxymethyl)ethyl acrylate or a mixture thereof;
   b. photoinitiator, photosensitizer or a mixture of photoinitiator and photosensitizer
wherein
   c. the average value of $n$ is in the range of from 0 to 1;
   d. said resin is present in an amount in the range of from about 5 percent to about 95 percent by weight of said binder;
   e. said reactive solvent is present in an amount in the range of from about 5 percent to about 95 percent by weight of said binder;
   f. said photoinitiator, said photosensitizer or said mixture of photoinitiator and photosensitizer is present in an amount in the range of from about 0.01 percent to about 10 percent by weight of said binder.

13. The radiation curable coating composition of claim 12 including extender pigment which is substantially transparent to ultraviolet light and which is present in an amount in the range of from about 30 percent to about 70 percent by weight of said radiation curable coating composition.

14. The radiation curable coating composition of claim 12 including titanium dioxide in an amount in the range of from about 0.1 percent to about 60 percent by weight of said radiation curable coating composition.

15. An article comprising a substrate having thereon a cured coating of the radiation curable coating composition of claim 1.

16. An article comprising a substrate having thereon a cured coating of the radiation curable coating composition of claim 12.

* * * * *

UNITED STATES PATENT AND TRADEMARK OFFICE
CERTIFICATE OF CORRECTION

PATENT NO. : 4,065,624
DATED : December 27, 1977
INVENTOR(S) : Paul J. Prucnal and Robert DeMajistre It is certified that error appears in the above-identified patent and that said Letters Patent are hereby corrected as shown below:

Column 2, lines 20-24, formula II should read, with the correction indicated by an arrow, as follows:

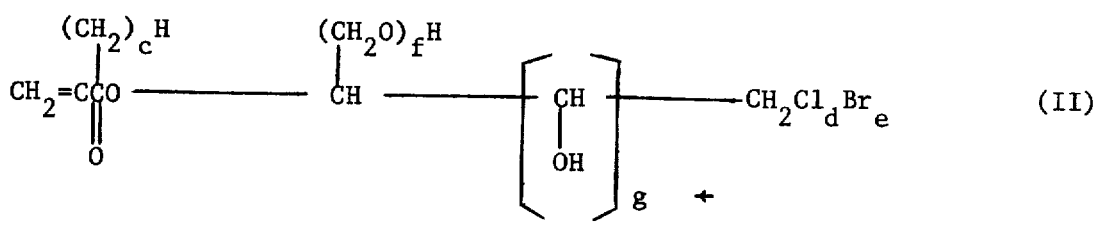

Column 3, line 67, delete "a" before the word "compound".

Column 3, line 67, insert --species-- after "compound".

Column 6, line 20, insert --present-- after "usually".

Column 12, lines 56-63, the structure shown in Example IX should read, with corrections indicated by arrows, as follows:

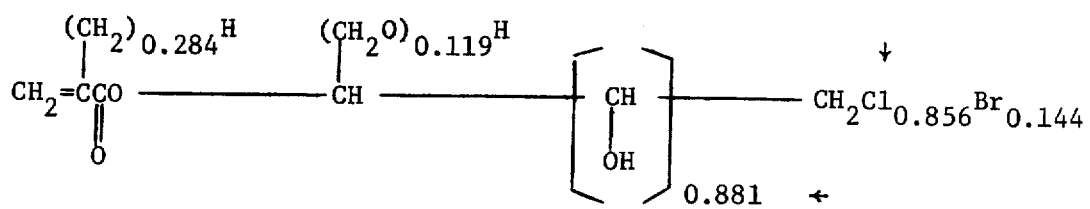

UNITED STATES PATENT AND TRADEMARK OFFICE
CERTIFICATE OF CORRECTION

PATENT NO. : 4,065,624

DATED : December 27, 1977

INVENTOR(S) : Paul J. Prucnal and Robert DeMajistre

It is certified that error appears in the above-identified patent and that said Letters Patent are hereby corrected as shown below:

Column 14, line 56, "or" should be --of--.

Column 19, line 22, "by" should be --of--.

Column 20, line 45, insert --per minute-- after "revolutions".

*Signed and Sealed this*

*Eleventh* Day of *July 1978*

[SEAL]

Attest:

RUTH C. MASON
*Attesting Officer*

DONALD W. BANNER
*Commissioner of Patents and Trademarks*